United States Patent
Wehde

[11] 3,845,995
[45] Nov. 5, 1974

[54] MAGNETICALLY MOUNTED ROTOR

[75] Inventor: Heinz Wehde, Rothenberg, Germany

[73] Assignee: Teldix GmbH, Heidelberg, Germany

[22] Filed: Feb. 27, 1973

[21] Appl. No.: 336,215

[30] Foreign Application Priority Data
Mar. 8, 1972 Germany............................ 2210995

[52] U.S. Cl...................... 308/10, 74/5.46, 310/156
[51] Int. Cl. ............................................ F16c 39/06
[58] Field of Search ............ 310/156, 263, 12, 166, 310/13; 308/10; 74/5.46; 324/151

[56] References Cited
UNITED STATES PATENTS

| | | | |
|---|---|---|---|
| 3,158,765 | 11/1964 | Polgreen .............................. | 310/12 |
| 3,243,238 | 3/1966 | Lyman................................ | 308/10 |
| 3,462,666 | 8/1969 | Martinek .......................... | 308/10 X |
| 3,480,811 | 11/1969 | Grosbard ......................... | 308/10 X |
| 3,638,093 | 1/1972 | Ross.................................. | 310/12 X |
| 3,694,041 | 9/1972 | Studer................................. | 308/10 |
| 3,698,775 | 10/1972 | Gilbert................................ | 308/10 |

Primary Examiner—Mark O. Budd
Attorney, Agent, or Firm—Spencer & Kaye

[57] ABSTRACT

A rotational magnetic device, such as those used in flywheels, includes a stator and a rotor. A plurality of permanent magnets are mounted on the rotor, arranged around the circumference of the rotor and alternating in polarity along the circumferential direction. A plurality of windings are arranged on the stator within the magnetic field produced by the permanent magnets. Current which is supplied to these windings produces forces on the rotor which control the positioning and movement of the rotor. This arrangement provides for a rotational magnetic device in which the drive mechanism and the bearing are combined into a single unit and the rotor can be freely suspended in any desired position so that it is in effect magnetically mounted.

5 Claims, 9 Drawing Figures

MAGNETICALLY MOUNTED ROTOR

BACKGROUND OF THE INVENTION

The present invention relates to a magnetic device including a stator and a rotor, the latter having permanent magnets of alternating polarity. Such a magnetic device is particularly useful in constructing a flywheel.

Flywheels are utilized, for example, in spacecraft or satellites for the stabilization of the craft's position. A distinction can be made between two different types of flywheels. The first, a control moment gyro, constantly revolves at a relatively high number of revolutions and, therefore, constitutes a solid base for the spacecraft due to the resulting gyro effect. A second type of flywheel, the reaction wheel, exerts a setting moment on the spacecraft in both directions of rotation of the rotor when the flywheel is accelerated due to the resulting reaction moment. The flywheels are preferably driven by an electric motor, for example a brushless d.c. motor of a known type with a permanent magnet rotor.

The number of revolutions or the torque of the rotor is controlled and regulated by the winding currents through a coil disposed on the stator.

The rotor is supported by slide or roller bearings or by gas bearings. The dependability and lifetime of the entire flywheels are significantly influenced by the bearings. An increase in the lifetime by ten years or more as is often required, for example, for communications satellites, can only be realized with the known bearings with difficulty and at a considerable expense. The main drawback of modifying these known bearings is the increase in the weight of the unit.

Furthermore, interfering moments resulting from friction can never be completely avoided in slide bearings and neither can the so-called turbine moments in gas bearings. As a result, the satellite will deviate in its position or losses will occur which reduce the efficiency of the arrangement.

Due to the occurrence of undesired events, such as a loosening of the housing as a result of meteorite action, extensive measures have thus far been required to prevent the bearing from being exposed to the vacuum of space in order to assure the operation of the bearings. This problem applies to slide bearings or roller bearings, because of the possible interruption of the lubricating film, and to gas bearings because of the possible loss of gas.

In order that flywheels be suitable for space travel they must meet the requirement of having low weight, low energy consumption and high dependability. The requirement for low weight is limited in the known flywheels by the fact that different devices are used for the drive mechanism and the bearing. The energy consumption of a flywheel is mainly determined by the load, i.e., the bearing, and secondarily by the efficiency of the drive mechanism since there is not much possibility of further improvement in the known bearings.

SUMMARY OF THE INVENTION

It is therefore an object of the present invention to provide a device which eliminates the above-mentioned drawbacks and which possesses high dependability, low weight and low energy consumption.

This is accomplished, according to the present invention, by arranging the windings on the stator and in the magnetic field of the rotor in such a manner that forces produced by a control of the winding currents are exerted on the rotor in the axial, radial and tangential direction in order to drive and support the rotor.

A substantial advantage of the present invention lies in the fact that the drive mechanism and the bearing are integrated into a single unit so that a substantial reduction in weight is realized. The energy consumption of the device according to the present invention is extremely low since no interfering moments occur between the rotor and the stator. Furthermore, the rotor has three orthogonal axes and three associated rotatory degrees of freedom since it is no longer mounted so as to be rotatable only about one exclusive axis, as are the known flywheels. Rather the rotor can be stably held and freely suspended in any desired position, with the longitudinal axis of a spacecraft serving as a possible reference axis for the intended position. Furthermore, appropriate control of the current in the coils permits the production of torques which cause the rotor to perform precession movements. The resulting reaction moments acting on the stator and, consequently, also on the spacecraft then serve to regulate the position of the spacecraft.

In a further embodiment of the present invention, the permanent magnets are made of a material having poor electrical conductivity. With such materials, for example, pressed metal oxides, losses due to eddy currents are substantially reduced.

In a particularly favorable embodiment of the present invention, which includes an annular external rotor having at its inner surface radially magnetized permanent magnets whose polarity alternates along the circumferential direction, the stator carries two conductor groups and the first group is arranged substantially axially while the second group is arranged substantially tangentially. The conductor groups are those conductors of the stator winding which have the same spatial alignment.

A significant advantage is provided by the rotor consisting of practically only a single ring in which the permanent magnets are disposed. Spokes and a hub, as are utilized in the known flywheels, are not necessary in the embodiments of the present invention. The entire mass which determines the moment of inertia for the rotor is disposed along the outer edge. A certain pitch, therefore, can be produced with a low weight. A special housing which would normally be required to keep the lubricant from evaporating is not necessary with a magnetically supported rotor.

The maximum permissible rate of rotation of the rotor is influenced substantially by its mechanical stability. In a very favorable further embodiment of the present invention, therefore, the rotor is produced from a wound band, preferably of spring steel, so that its stability will be increased in an advantageous manner.

The annular rotor is known to be a system capable of vibration. Especially when the resonant frequency of the rotor lies in the range of the starting frequency of the winding currents, suitable damping means must be provided. In a very advantageous embodiment of the rotor, material with high internal damping is provided between the individual layers of the wound band so that any vibrations in the rotor that occur are strongly attenuated.

It should be expressly noted that the use of the device according to the present invention is not limited solely to spacecraft or satellites. Such devices can also be used, for example, in the centrifuges of nuclear reactors or other installations which are accessible only with great difficulty. For these applications the complete freedom from maintenance of the device according to the present invention is of particular importance since there are no signs of wear or lubrication problems.

DESCRIPTION OF THE PREFERRED EMBODIMENTS

It is known that a reaction force F is exerted on a section of conductor having the length $l$ and through which a current $i$ flows, and which is disposed in a homogeneous magnetic field of the field density B. The direction and magnitude of this reaction force are calculated by the known vector equation:

$$F = l \cdot \overline{i} \times \overline{B}$$

This equation forms the basis for calculating torques in electrical machines if, for example, current flows through axially directed windings in radially directed magnetic fields and can also be used to calculate the forces created in the device according to the present invention.

Figure 1:
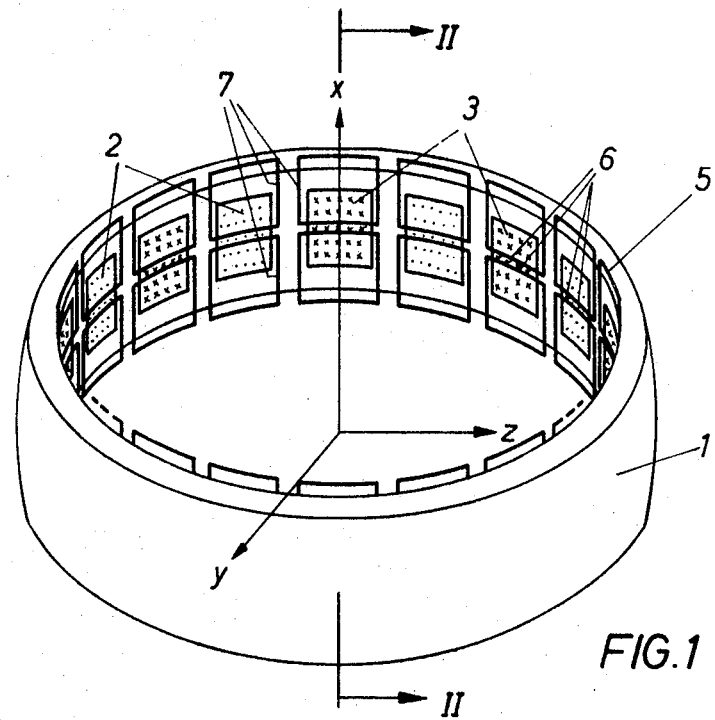
FIG. 1 is a perspective schematic representation of an embodiment of the present invention having an annular rotor.

FIG. 1 is a partly pictorial and partly schematic view of a particularly advantageous embodiment of the present invention. The device includes an annular rotor 1 which preferably consists of magnetically conductive material and which has radially magnetized permanent magnets 2, 3 on its inner surface. The magnets alternate in polarity around the rotor circumference, as indicated. The resulting magnetic field is substantially radially directed in the area in front of each of the permanent magnets and substantially tangentially directed in the areas between the permanent magnets. The cross section of rotor 1 which forms the magnetic return paths for the permanent magnets is so dimensioned that the magnetic flux of the permanent magnets is maximized at the inside of the rotor.

Figure 2:
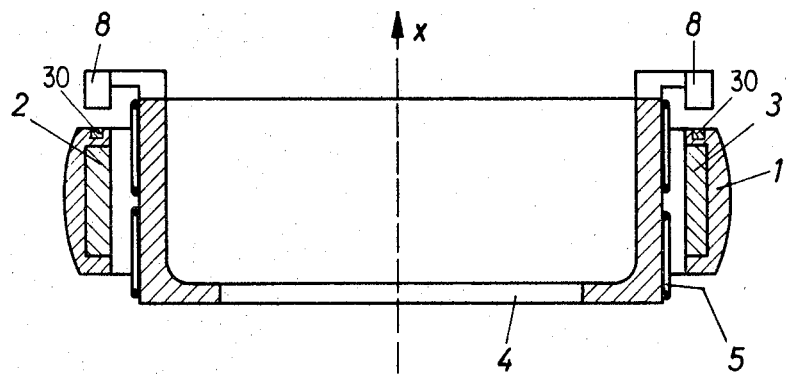
FIG. 2 is a longitudinal cross-sectional view along line II—II of FIG. 1 and also showing a portion of the stator.

The stator 4, which is shown in FIG. 2, is axially symmetrical with respect to the $x$ axis, which is the main axis of rotation of the rotor, and contains at its outer periphery windings 5 formed of groups of conductors 6 extending substantially tangentially, or circumferentially, and groups of conductors 7 extending substantially axially. The entire coil is constructed symmetrically with respect to the $yz$ plane.

The stator also includes known sensors 8, for example inductive, capacitive or optical sensors, which detect the instantaneous position of the rotor by means of counterpieces 30 disposed on the rotor. In addition to the two sensors 8 shown in FIG. 2, which detect the position of the rotor in the axial direction, further sensors are provided to detect the position of the rotor in the radial direction. The latter sensors are spatially disposed at at least three points uniformly distributed around the stator periphery. A further group of sensors detects the angular position of the rotor and furnishes signals for the rotation of the flywheel.

Figure 3A:
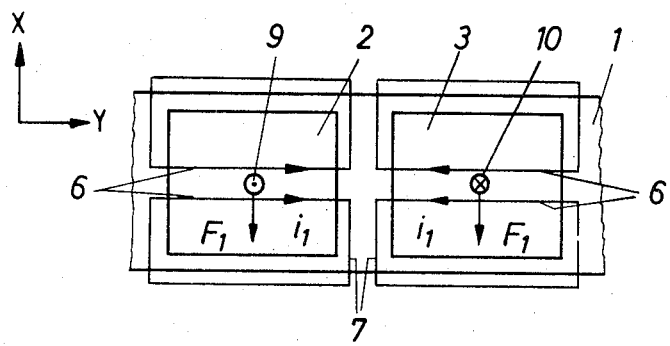
FIGS. 3a–c are developed views of a pair of magnetic poles, a portion of the stator windings, the possible winding currents and resulting forces on the rotor.

Deviations from the intended position of the rotor shown in FIG. 3 are thus detected by the above-mentioned sensors, whose output signals control the currents in the groups of conductors 6, 7 of the stator winding, for example via known electronic amplifiers, so that forces are produced on the conductors and the corresponding reaction forces act on the rotor to keep it rotating stably and freely suspended in the desired position. It is also possible, by means of further control signals acting on the amplifiers, to influence the position, rate of rotation or torque of the rotor.

The principles of operation will be explained with the aid of FIGS. 3 where a pair of poles 2, 3 of the rotor is projected into a plane which is parallel to the xy plane and a portion of the windings of the stator are shown as individual windings.

In the illustrated region the permanent magnet field is directed substantially radially in the area of the permanent magnets, as shown by the arrows 9, 10. At the relative stator position shown in FIG. 3, the groups of conductors 6 of the stator winding extend substantially tangentially in the areas of the rotor poles so that, based on the above-cited vector equation, a force $F_1$ acts on the permanent magnets 2, 3 in the axial direction when currents $i_1$ flow through the stator winding in the direction shown by the arrows. The currents from conductor groups 7 in this case furnish no force component since the partial forces of the symmetrical current arrangement cancel one another out, as can be easily determined.

Figure 3B:
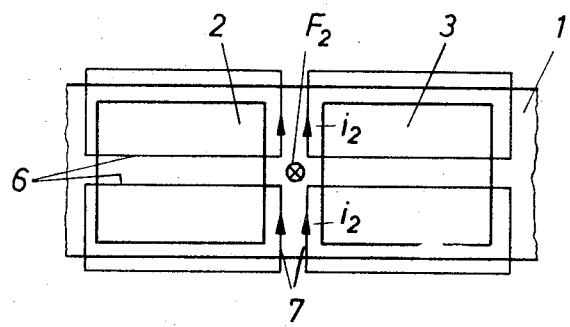

If, however, currents $i_2$ flow through the stator winding as shown in FIG. 3b, the currents through the conductor groups 6 cannot produce a reaction force. However, the currents $i_2$ of conductor groups 7 in the area between the permanent magnets, in which the field lines extend substantially tangentially, produce a reaction force $F_2$ in the radial direction.

Figure 3C:
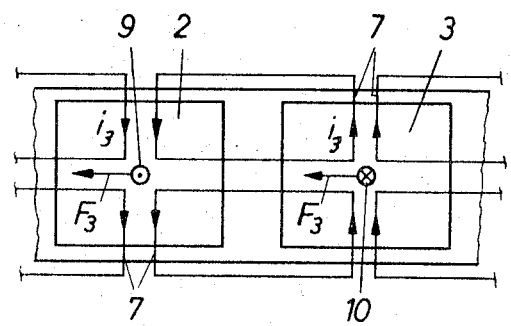

In FIG. 3c the rotor is further rotated by one quarter pole pitch. If the currents $i_3$ flow through the windings, forces $F_3$ are produced in the tangential direction.

In FIGS. 3 it was shown how forces can be created to act on one pair of poles in the three directions. A number of such pairs of poles are disposed on the rotor so that translatory or rotatory movements of the rotor can be obtained by equal-phase or opposite-phase control of oppositely disposed groups of stator conductors. If, for example, the group of conductors (not shown)

which is diametrically opposite one of the groups shown in FIG. 3c receives current flowing in the same direction as the current through the one group, the rotor is moved in the y direction. If, however, the diametrically opposed group of conductors receives currents in the opposite direction, a torque about the x axis results. The corresponding relations exist for the other two cases, involving radial and axial forces.

With the illustrated arrangement it is thus possible to produce forces in three directions and torques about the three spatial axes, depending on the type of control employed. By superimposing winding currents, particularly in electronic prestages, it is particularly simple to also produce combinations of the above-mentioned movements. The above-mentioned forces and torques can of course also be produced by superimposing the fields of separate windings through which the output signals of the respective control circuit flow.

Figure 4:
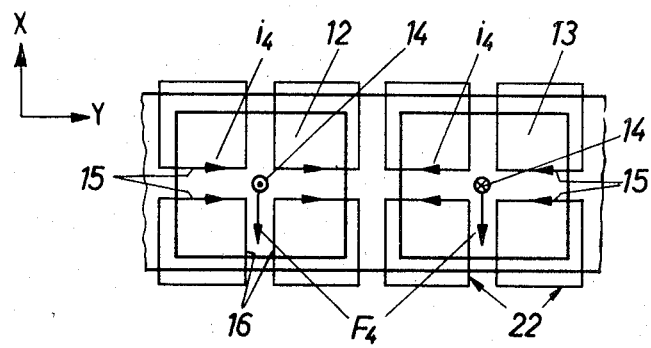
FIG. 4 is a developed view of a portion of the annular rotor and a portion of the stator windings of a further embodiment of the present invention.

FIG. 4 is a schematic illustration of another embodiment of the present invention, in which a pair of poles 12, 13 is projected together with the permanent magnets of the rotor and a portion of the stator winding in a plane parallel to the xy plane. The direction of the field lines in front of the permanent magnets 12, 13 is shown by arrows 14. Groups of conductors 15 extend in the circumferential, or tangential, direction, while groups of conductors 16 extend axially, in the x direction. If currents $i_4$ flow through the stator winding in the indicated manner, a reaction force becomes effective in the x direction. With appropriate control of the stator winding currents, reaction forces can likewise be produced in the other directions so that the rotor can again be held stable and freely suspended.

For this embodiment it is particularly advantageous that all reaction forces can be produced simultaneously at practically every position of the rotor and that no rotation about the x axis is required to stabilize the rotor. The stator winding can furthermore be produced particularly easily since it consists of a number of identical individual coils 22.

Figure 5:
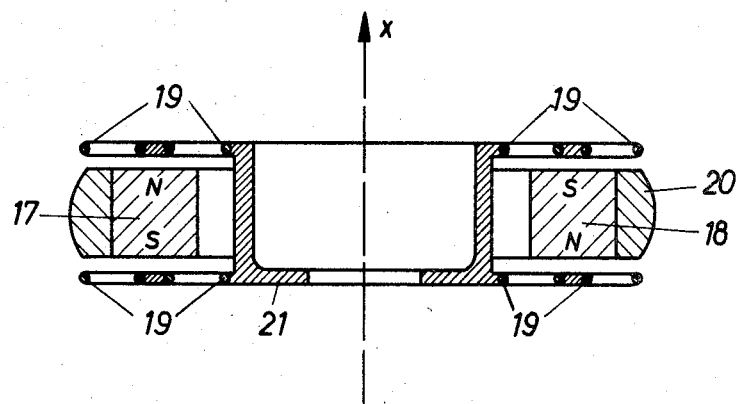
FIG. 5 is a longitudinal cross-sectional view of a further embodiment of the present invention with axially directed permanent magnets on the rotor.

The embodiment shown in FIG. 5 has a rotor 20 which is symmetrical to the x axis and whose permanent magnets 17, 18 are magnetized axially in the x direction and have alternating polarity along the circumferential direction. The windings 19 of stator 21 are arranged in two planes perpendicular to the x axis in front of the permanent magnets 17, 18, and may be constructed to be axially symmetrical with respect to the abovementioned axis, corresponding to the two earlier mentioned embodiments. Such an arrangement is particularly advantageous if higher tolerances are desired for the free mobility of the rotor in a direction perpendicular to the x axis. Furthermore this results in an advantageous utilization of the magnetic volume. Ring 20 in this arrangement is preferably made of a nonmagnetic material and only serves to absorb the centrifugal forces during rotation.

The rotor of any of the embodiments of the invention can be constructed of a wound band which preferably would consist of spring steel. Furthermore, in order to increase the stability of such a rotor against vibrations a material with a high internal damping characteristic can be provided between the layers of the wound band.

The above-mentioned embodiments will suggest further configurations of the device according to the present invention to the person skilled in the art. The only important thing is that the magnetic field of the rotor have at least three regions whose field lines are substantially perpendicular to one another and that in the stated regions groups of conductors of the stator winding be preferably arranged perpendicular to the field lines.

Figure 6:
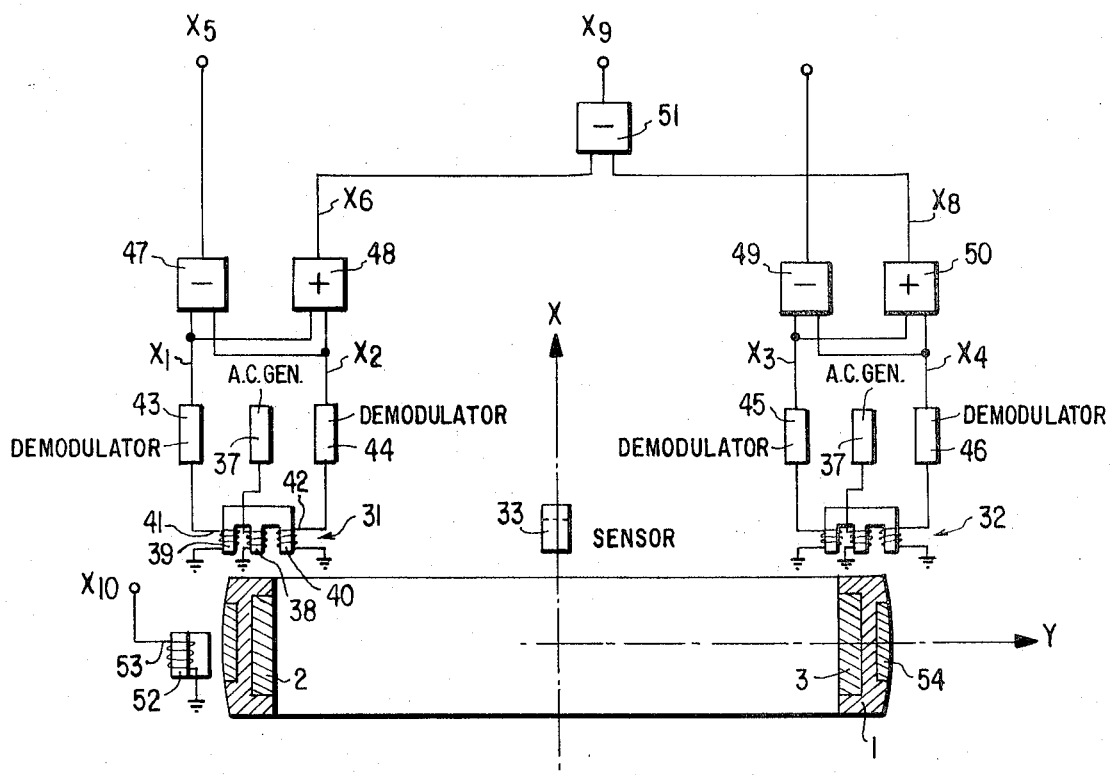
FIG. 6 is a longitudinal cross-sectional view with position sensors mounted on the stator.

FIG. 6 is a longitudinal cross-sectional view of a further embodiment of the present invention with E-shaped position sensors mounted on the stator. In connection with the detailed discussion of the structure of the sensors, it should be noted that numerous differing sensors structures suitable for use with the present invention are well known to those skilled in art. In this regard, one specially suitable sensor is disclosed in G.B. Patent No. 1,111,456 entitled "Inertial Navigational and Positional Systems," filed on July 14, 1965. As indicated in FIG. 6 the sensors 31 and 32 are provided symmetrically in the xy plane with respect to the x axis on the stator. In the same manner in the xz plane the sensor 33 and another sensor (not shown) are provided symmetrically with respect to the x axis.

The central leg 36 of each E shaped sensor is excited by an AC-generator 37. This signal carried by the winding 38 causes an AC-magnetic field to exist in the flux-paths defined by the central 36 or outer legs 39, 40 and the rotor 1. Any motion of the rotor 1 will cause a change in the reluctance of the portions of the paths between the central and outer legs of the sensors arrangement, so that the output signals of the two windings 41, 42 will be changed. Consequently, the signals generated in the outer windings 41, 42 will be amplitude-modulated by the reluctance changes caused by the motion of the rotor 1. The outer windings are coupled with standard demodulators 43, 44 for generating DC signals $x_1$, $x_2$ corresponding to the amplitude of the outer winding signals. When the rotor 1 is in its normal position as shown in FIG. 6 the signals $x_1$, $x_2$ and also the signals $x_3$, $x_4$ of the other hand sensor 32 will have an equal level. The demodulators 43 – 46 are connected with two well known adding means 47 – 50. When the rotor 1 is moved in the y direction, the signal $x_2$ will be greater than the signal $x_1$ so that the difference signal $x_5$ generated by the adding means 47 will correspond to the rotors motion in the y direction. When the rotor 1 is moved in the x direction the sum-signal $x_6$ of the signals $x_1$ and $x_2$ generated by the adding means 48 will correspond to the rotors motion in the x direction. In the same manner the sum signal $x_8$ of the sensor 32 will be generated by adding means 50. Said signals $x_6$ and $x_8$ will have an equal level if the rotor is moved in the x direction. For sensing an angular displacement of the rotor 1 about the z axis another adding means 51 are provided. When the rotor 1 is turned about the z axis the signals $x_6$, $x_8$ are differing in their level, so that the difference signal $x_9$ between the signals $x_6$, $x_8$ corresponds to the angular displacement of the rotor. It is evident that in the same manner signals corresponding to the rotors angular displacement about the y axis and radial motion in the z direction can be sensed by the sensor 33 and said other sensor provided in the xz plane.

In order to detect the angular position about the x axis of the rotor 1 there is provided a sensor 52 opposite to the outer surface of the rotor 1. In this regard, one specially suitable sensor is disclosed in the U.S. Pat. No. 2,867,762 entitled "Commutatorless Electric Motor" filed on Apr. 29, 1955. The C-shaped sensor 52 comprises a signal winding 53. The outer surface of the rotor 1 comprises radially magnetized permanent magnets 54 preferably of the same number like said permanent magnets 2, 3. Corresponding to the momentary angular position of the rotor an alternating signal $x_{10}$ will be induced in the winding 53 when the rotor is turned around the $x$ axis.

Figure 7:
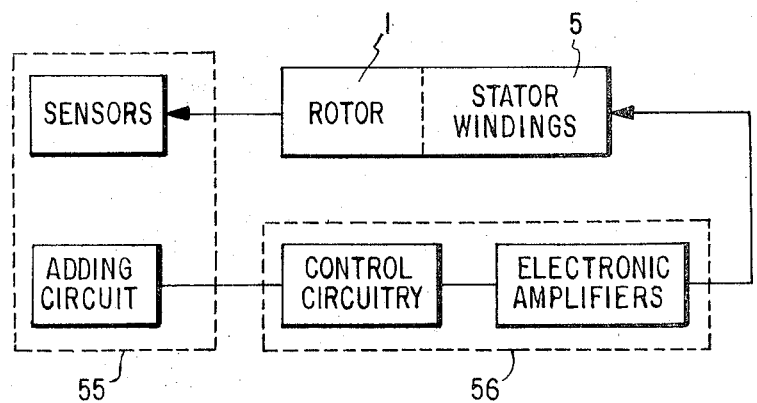
FIG. 7 is a simplified representation of a block diagram comprising the sensor arrangement of FIG. 6 and the current generating means.

FIG. 7 is a simplified representation of a block diagram comprising the sensor arrangement of FIG. 6 and the current generating means. As mentioned above in connection with the FIGS. 3 and 6 it is the simplest way to coordinate each of said sensors in the $xy$ plane and the $xz$ plane with one group of conductors 6 and 7. It should be noted in connection with torquing the rotor that while a torquing force couple applied about the $x$ axis (spin axis) will cause the rotor to rotate about the $x$ axis as it is well known to one skilled in the art, torquing the rotor about the $y$ axis will result in rotation of the rotor about the $z$ axis. Furthermore torquing the rotor about the $z$ axis will result in rotation of the rotor about the $y$ axis. As shown in FIG. $3a - 3c$ the conductor groups 6 and the conductor groups 7 can be used to create the disered forces in the three directions and also the torques about the three orthogonal axis (in tangential direction). As well known to one skilled in art all said forces and torques can be produced by superimposing the winding currents in the electronic amplifiers of the current generating means 56. As shown in FIG. 7 the sensor arrangement 55 includes all the sensors discribed in FIG. 6 and also the adding means for generating the signals corresponding to the rotors motion in the three directions and the motions about the three axis. The sensor arrangement 55 is connected with the current generating means which comprises well known control circuitries and the electronics amplifiers. Furthermore the output of the electronic amplifiers are connected with the conductor groups 6 and 7 of the stator windings 5.

It will be understood that the above description of the present invention is susceptible to various modifications, changes and adaptations, and the same are intended to be comprehended within the meaning and range of equivalents of the appended claims.

I claim:

1. A magnetic device comprising, in combination:
a stator;
a rotor disposed for rotation relative to said stator;
a plurality of permanent magnets mounted on, and spaced around the circumference of, said rotor to be in the form of a ring with the magnets alternating in polarity around said rotor circumference in a manner such that the magnetic field lines extend substantially parallel to a surface of said rotor between said rotor and said stator in regions between adjacent magnets and extend substantially perpendicular to such rotor surface in the region of each magnet;
a plurality of windings disposed on said stator and composed of first and second conductor groups distributed around the circumference of said stator to intersect said field lines, with the conductors of said first group being transverse to the conductors of said second group, the conductors of both said groups being substantially parallel to such rotor surface, the conductors of said first group being oriented transverse to the field lines in regions between adjacent magnets, and the conductors of said second group being oriented transverse to the field lines in the region of each magnet; and
current generating means connected to said windings for providing currents in said windings which create forces acting on the rotor in the axial, radial and tangential directions, relative to the direction of rotor rotation, for driving and positioning said rotor with respect to said stator.

2. A magnetic device as defined in claim 1 further comprising: sensing means connected to said current generating means and located on said stator for detecting the position of said rotor with respect to three orthogonal axes and its three associated rotatory degrees of freedom and providing to said current generating means an output indicative of the position of said rotor.

3. A magnetic device as defined in claim 1 wherein said permanent magnets consist of material having poor electrical conductivity.

4. A magnetic device as defined in claim 1, wherein said rotor is an external rotor; said permanent magnets are radially magnetized and circumferentially spaced around the inner surface of said rotor; said first group of conductors is arranged substantially axially with respect to said rotor; and said second group of conductors is arranged substantially tangentially with respect to said rotor.

5. A magnetic device as defined in claim 1, wherein said rotor has an annular shape; said permanent magnets are axially magnetized; said first group of conductors is arranged substantially radially with respect to said rotor; and said second group of conductors is arranged substantially tangentially with respect to said rotor.

* * * * *